April 14, 1959
G. A. LYON
2,882,095
WHEEL COVER
Filed Aug. 19, 1955
2 Sheets-Sheet 1
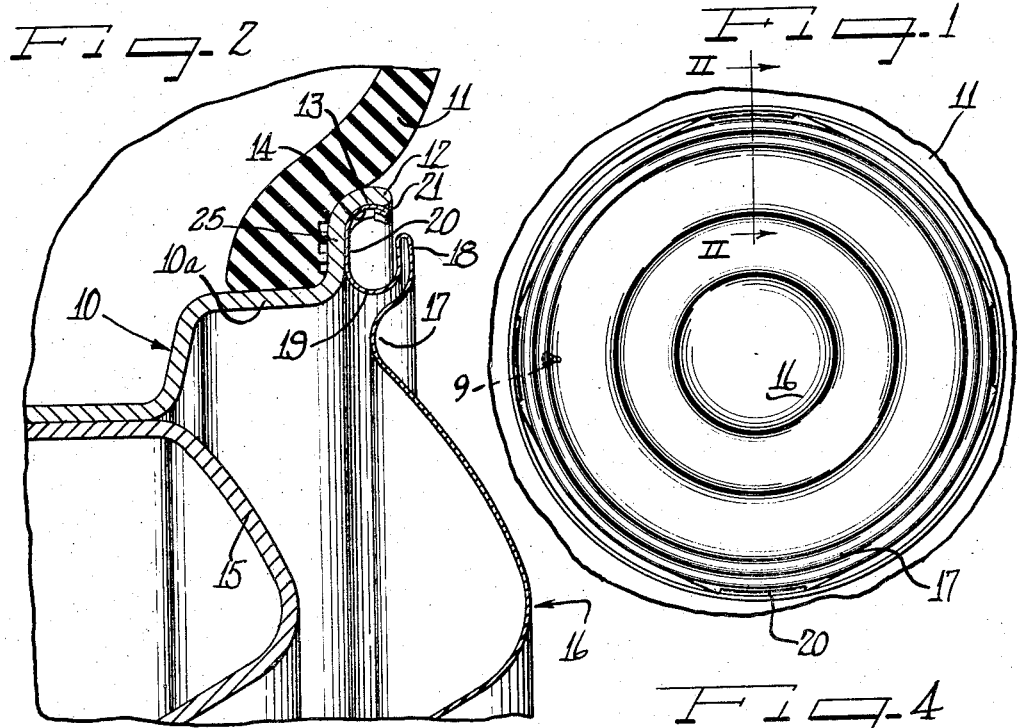
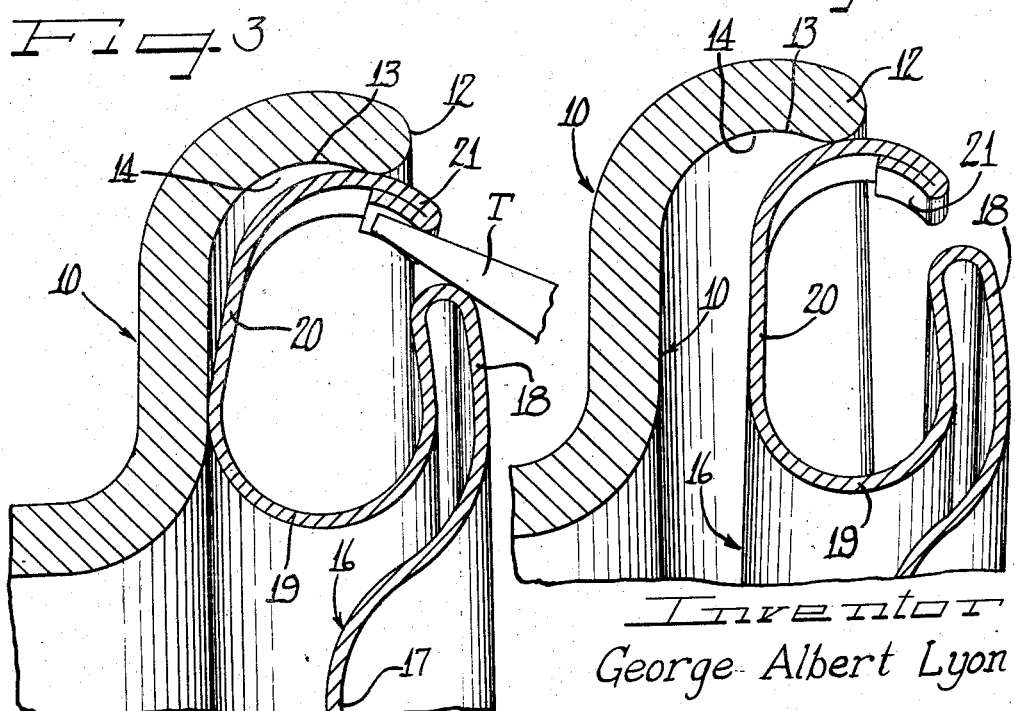
Inventor
George Albert Lyon April 14, 1959  G. A. LYON  2,882,095
WHEEL COVER
Filed Aug. 19, 1955  2 Sheets-Sheet 2
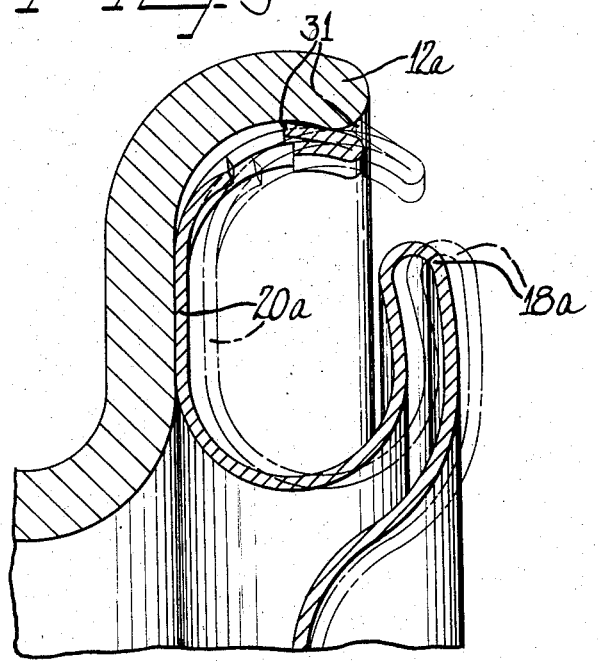
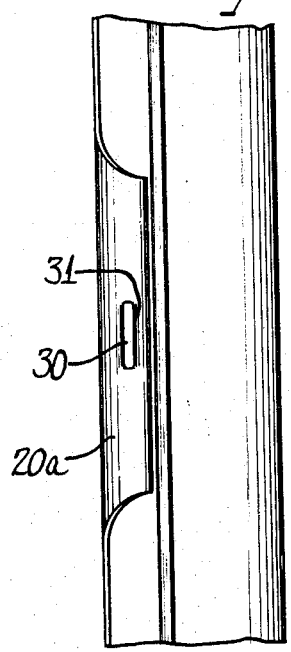
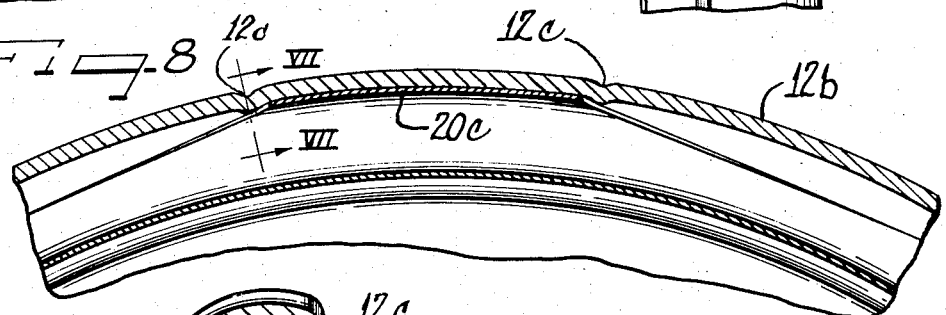
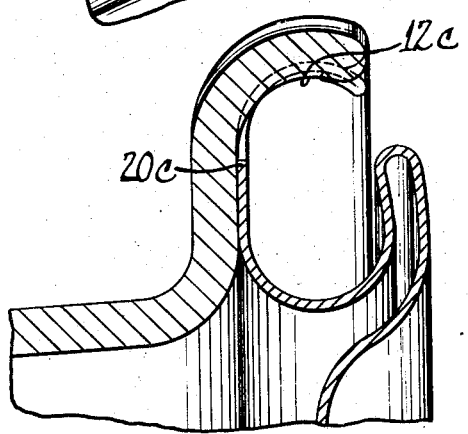
Inventor
George Albert Lyon United States Patent Office 2,882,095
Patented Apr. 14, 1959

2,882,095

WHEEL COVER

George Albert Lyon, Detroit, Mich.

Application August 19, 1955, Serial No. 529,407

10 Claims. (Cl. 301—37)

This invention relates to wheel covers and more particularly to a self-retained wheel cover.

At the present time, automobile manufacturers are resorting to the use of smaller wheels such as fourteen-inch wheels. Also, many of the wheels that are used have tubeless tires and, as a consequence, the outer terminal rim flange is curled to a greater extent to facilitate application and removal of the tire.

With the advent of the use of such smaller wheels, automobile manufacturers have become desirous of using wheel covers of maximum diameter so as to present a relatively great mass of ornamental metal on the wheel. In other words, there is a tendency to offset the use of a smaller wheel by the use of a larger wheel cover so as to accentuate the wheel and to still have it in proportion to other ornamental appointments of the automobile.

However, because automobile companies have become more economy minded in the past year, they are desirous of obtaining a larger wheel cover without increasing the cost of the same by virtue of the use of a greater amount of metal. When the cover is made of a lustrous metallic material, such as stainless steel, any increase in diameter of the wheel cover necessarily materially adds to the cost of the raw material going into the cover.

It is an object of this invention to provide an improved wheel cover which will meet some of the foregoing problems and which can be manufactured without any substantial increase in cost despite its larger diameter.

Another object of this invention is to provide a wheel cover which can take advantage of the curled terminal tire rim flange, in a novel way, in the retention of the cover on the wheel.

Yet another object of this invention is to provide a wheel cover with self-retaining means of such character whereby, in effect, the cover is positively interlocked to the tire rim and requires separate disengagement of a series of fingers of the cover from the rim flange before the cover can be removed thereby minimizing the likelihood of accidental dislodgment or loss of the cover, in use, from the wheel.

Still another object of this invention is to provide a wheel cover which will more effectively resist turning relative to the wheel tire rim on which it is retained in the rotation of the wheel.

In accordance with the general features of this invention, there is provided in a wheel cover structure including a wheel tire rim having a curled terminal flange defining a radially inwardly facing groove, a circular wheel cover member having a turned outer peripheral edge for disposition inside of and in close proximity to but spaced slightly from the curled rim edge and having an axially rearwardly extending continuous annular flange with a plurality of circumferentially spaced cover member retaining fingers curled back over the flange in spaced relation thereto with their terminals disposed in proximity to the outer edge of the member, the curled terminals of the fingers being arranged generally in a common circle for tensioned nested engagement in the groove with each of their edges accessible from the exterior of the cover member for direct engagement by a pry-off tool bearing on the exterior of said turned edge of the cover member.

Another feature of the invention relates to providing the finger with a positive shoulder for cooperation with the terminal rim flange to hold the finger in disengaged position after it has been released and while a further finger is being disengaged.

Still another feature of the invention relates to the provision of indentations forming a socket in the terminal rim flange for receiving the cover finger for resisting turning of the cover on the wheel.

Other objects and features of this invention may more fully appear from the following detailed description taken in connection with the accompanying drawings which illustrate several embodiments thereof and in which—

Figure 1 is a fragmentary side view of a wheel assembly provided with a wheel cover embodying the features of this invention;

Figure 2 is an enlarged fragmentary cross-sectional view taken on the line II—II of Figure 1 looking in the direction indicated by the arrows;

Figure 3 is a fragmentary view similar to Figure 2 but drawn to a still larger scale showing how a pry-off tool is applied from the exterior of the cover to the extremity of one of the curled fingers in the removal of the cover from the wheel;

Figure 4 is a view similar to Figure 3 showing how one of the fingers has been removed and is held from snapping back into its retaining position so as to permit of the subsequent disengagement of another finger in the removal operation;

Figure 5 is a cross-sectional view similar to Figure 3 showing a modification of the invention and illustrating by dotted lines the position of the finger after it has been disengaged from nested cooperation with the curled terminal flange of the rim;

Figure 6 is a fragmentary view looking at the front of the modification illustrated in Figure 5;

Figure 7 is a fragmentary sectional view similar to Figure 5 taken on the line VII—VII of Figure 8 looking in the direction indicated by the arrows; and Figure 8 is a fragmentary cross-sectional view of the structure of Figure 7 showing more clearly how the finger seats in the depression in the curled rim flange.

As shown on the drawings:

The reference character 10 designates generally a multi-flanged drop-center type of tire rim in which is disposed in the usual way a pneumatic tire 11 which may, for example, be of the so-called tubeless type. The tire rim 10 includes an outer curled terminal flange 12 accessible from the exterior of the wheel and which permits of easy application and removal of the tire. As is best shown in Figure 3, the terminal flange 12 has an undercut curved surface 13 which defines a groove 14 which faces radially inwardly or, in other words, the axis of the wheel.

The tire rim 10 is otherwise of a well-known construction and is carried in the customary manner by a body or central supporting member 15 adapted to be detachably secured in the customary way on an axle of a vehicle by bolts or the like (not shown). Cooperable with the aforesaid wheel assembly is a sheet metal metallic cover embodying the features of this invention and designated generally by the reference character 16. This wheel cover may comprise a full disk member or an annulus whichever is desired and as is well known in the art. It includes an outer dished portion 17 which is suitably apertured to permit a valve stem 9 (Figure 1) to project therethrough so as to be accessible from the exterior of the wheel and cover.

The annular depressed area 17 of the wheel cover leads into a turned outer peripheral marginal edge 18 which has an axially rearwardly extending continuous annular flange 19.

The continuous annular flange 19 underlies the peripheral marginal edge 18 of the cover and is provided with a plurality of circumferentially spaced cover retaining fingers 20. These fingers have their free terminals extending beyond the peripheral marginal edge 18 as is best shown in Figure 2. The retaining fingers 20 may be of any suitable number although I preferably contemplate making them four in number so as to make use of four corners of a blank from which a circular sheet metal cover 16 is stamped. Any suitable sheet metal may be employed although I contemplate using sheet metal such as stainless steel because of its resiliency and its ability readily to have a highly lustrous finish.

Each of the free extremities or terminals of the fingers 20 is curled and slightly turned as indicated at 21 so as to reinforce the edge of the finger for engagement by a pry-off tool T (Figure 3). Also, the slight turning of the edge 21 of each finger minimizes the likelihood of the edge of the same cutting one's fingers.

Normally, when the curled cover retaining fingers 20 are in engagement with the curled and grooved terminal rim flange 12 (as is shown in Figure 2), each finger is bottomed rearwardly at 25 against the rim flange and has its terminal edge 21 nested in the annular groove 14 of the terminal flange so as to be positively interlocked with the terminal flange under the back-up tension of cover flange 19.

When in this position, the fingers are all in tight tensioned nested engagement with the curled rim flange. The reason for this is that the curled extremities 21 of the fingers are normally substantially arranged in a common circle of a diameter slightly greater than that of the curved surface 13 of the rim flange 12. As a consequence, when the curled fingers are snapped or pressed into the groove 14, they are in tight gripping engagement with the curved surface 13 defining the groove 14 of the rim flange 12.

The engagement of the curled fingers with the terminal rim flange 12 occurs outwardly beyond the peripheral margin 18 of the cover, but in close proximity to the cover edge. The distance separating the outermost surface of turned cover edge 18 and the finger terminals 21 should be only great enough to permit of the insertion of the edge of a pry-off tool T such as a screwdriver between the cover edge and the fingers in the disengagement of the cover from the wheel. This enables a maximum diameter of cover so that a relatively great expanse of ornamental metal is provided on the wheel. Then, too, by virtue of the fact that the continuous flange 19 does not have to extend radially inwardly for cooperation with an internal flange, such as the inclined flange 10a (Figure 2) of the tire rim, less metal is required in the manufacture of the wheel cover and more of the metal can be incorporated in the actual ornamental expanse of cover metal visible from the exterior of the wheel.

The interlock between the curled finger terminals 21 and the curled rim flange 12 is of such force and effect that the mere release of one finger will not result in disengagement of the cover from the wheel. Therefore, there is little likelihood of the cover becoming accidentally dislodged from the wheel in its use thereby minimizing the loss of wheel covers in their use.

The removal of the cover may be easily effected by inserting the pry-off tool T (Figure 3) between cover edge 18 and the terminal fingers 20 and by fulcruming the tool on the edge 18 to roll the curled terminal finger extremity 21 out of curled rim flange 12. I find that by virtue of the fact that the turned cover edge 18 is outwardly of the extremities 21 of the fingers, adequate leverage is possible to effectively move the finger from the position shown in Figure 2 to the position shown in Figure 3 and to the released position shown in Figure 4. In this released position, the curled extremity 21 of the finger is completely out of the groove 14 and resting against the edge of terminal rim flange 12.

However, as noted before, I have found that with this structure the fingers can be provided with such tension nested coaction with terminal rim flange 12 that even upon the release of one finger, as shown in Figure 4, the cover still cannot be disengaged from the wheel until a further finger is released. Upon a further or second finger being released to the position shown in Figure 4, the cover 16 can then be lifted from the wheel.

In the application of the cover to the wheel, the cover is first placed over the wheel with the valve stem 9 projecting through the depressed portion 17; and then the cover is manually struck to snap or jam the fingers 20 into nested retaining cooperation with the terminal flange 12 as shown in Figure 2.

In Figures 5 and 6, I have illustrated a modification of the invention which is identical to the first form but wherein a slightly different form of finger 20a is employed for cooperation with the terminal rim flange 12a. In this form the end of the finger is provided with a slight cut-out 30 to provide an edge or shoulder 31. As a consequence, when the finger 20a is released, as shown by the dotted lines in Figure 5, the shoulder 31 will engage the outer shoulder of the rim flange 12a to assist in retaining the finger against snapping back of its own accord into the groove of the terminal flange. However, if the tension of the finger is properly predetermined and the terminals of the fingers 20a are disposed axially rearwardly of the turned cover edge 18a, I find that I can release a finger without it necessarily snapping back into retained position. The shoulder 31 merely provides an additional safeguard against the finger accidentally snapping back into the groove of the terminal flange 12a.

In Figures 7 and 8 there is illustrated a still third form of the invention wherein the only difference over the first form resides in the fact that the terminal flange 12b has slight radial indentations forming shoulders 12c between which the curled extremity of the finger 20c is seated or socketed when in retaining engagement. The pairs of shoulders 12c correspond in number and location to that of fingers 20c. This feature is advantageous in that it further tends to preclude relative rotary movement of the cover and wheel in the use of the wheel. While ordinarily the fingers may have adequate tensioned engagement with the rim flange, I find that as an additional safeguard against the cover turning on the wheel the use of the shoulders or depressions 12c will positively preclude any relative rotation.

With the exception of the foregoing differences, the two forms of the invention shown in Figures 5 and 6 and Figures 7 and 8 are identical to the first form and operate in the same manner as described in the case of the first form.

It will be understood that modifications and variations may be effected without departing from the scope of the novel concepts of the present invention.

I claim as my invention:

1. In a wheel structure including a wheel tire rim having a curled terminal flange defining a radially inwardly facing groove, a circular wheel cover member having a turned outer peripheral edge for disposition inside of and in close proximity to but spaced slightly from said curled rim edge and having an axially rearwardly extending continuous annular flange with a plurality of circumferentially spaced cover member retaining fingers curled back over said flange in spaced relation thereto with their terminals disposed in spaced proximity to the outer edge of said member, the curled terminals of said fingers being arranged generally in a common circle for tensioned nested engagement in said groove with each of their edges accessible from the exterior of the cover member and directly engageable by the tip of a pry-off tool with the exterior of said turned edge of the cover member acting as a fulcrum for the tool.

2. In a wheel structure including a wheel tire rim having a curled terminal flange defining a radially inwardly facing groove, a circular wheel cover member having a turned outer peripheral edge for disposition inside of and in close proximity to but spaced slightly from said curled rim edge and having an axially rearwardly extending continuous annular flange with a plurality of circumferentially spaced cover member retaining fingers curled back over said flange in spaced relation thereto with their terminals disposed in proximity to the outer edge of said member, the curled terminals of said fingers being arranged generally in a common circle for tensioned nested engagement in said groove with each of their edges accessible from the exterior of the cover member for direct engagement by a pry-off tool bearing on the exterior of said turned edge of the cover member, each of said curled finger terminals having a radially outwardly projecting slight shoulder for engaging an outer surface of the terminal rim flange upon disengagement of the finger from nested cooperation to prevent accidental snapping back of the finger into nested engagement while another finger is being released.

3. In a wheel structure including a wheel tire rim having a curled terminal flange defining a radially inwardly facing groove, a circular wheel cover member having a turned outer peripheral edge for disposition inside of and in close proximity to but spaced slightly from said curled rim edge and having an axially rearwardly extending continuous annular flange with a plurality of circumferentially spaced cover member retaining fingers curled back over said flange in spaced relation thereto with their terminals disposed in proximity to the outer edge of said member, the curled terminals of said fingers being arranged generally in a common circle for tensioned nested engagement in said groove with each of their edges accessible from the exterior of the cover member for direct engagement by a pry-off tool bearing on the exterior of said turned edge of the cover member, said terminal flange having spaced radial shoulders for receiving between them a curled finger to resist turning of the cover member on the wheel.

4. In a wheel structure including a wheel tire rim having a curled terminal flange defining a radially inwardly facing groove, a circular wheel cover member having a turned outer peripheral edge for disposition inside of and in close proximity to but spaced slightly from said curled rim edge and having a plurality of circumferentially spaced cover member retaining fingers extending axially rearwardly from said edge and curled back over themselves toward the outer side of the cover member with their terminals disposed in spaced proximity to the outr edge of the member, the curled terminals of the fingers being arranged generally in a common circle for tensioned nested engagement in said groove with each of their edges accessible from the exterior of the cover member and directly engageable by the tip of a pry-off tool with the exterior of said turned edge of the cover member acting as a fulcrum for the tool, each of said finger terminals being formed so as to interlock positively in said groove and said cover member being releasable only upon positive manual disengagement of at least two of said fingers from the groove.

5. In a wheel structure including a wheel tire rim having a curled terminal flange defining a radially inwardly facing groove, a circular wheel cover member having a turned outer peripheral edge for disposition inside of and in close proximity to but spaced slightly from said curled rim edge and having a plurality of circumferentially spaced cover member retaining fingers extending axially rearwardly from said edge and curled back over themselves toward the outer side of the cover member with their terminals disposed in proximity to the outer edge of the member, the curled terminals of the fingers being arranged generally in a common circle for tensioned nested engagement in said groove with each of their edges accessible from the exterior of the cover member for direct engagement by a pry-off tool bearing on the exterior of said turned edge of the cover member, each of said finger terminals being formed so as to interlock positively in said groove and said cover member being releasable only upon positive manual disengagement of at least two of said fingers from the groove, said curled terminal flange having spaced radially inwardly extending pairs of spaced shoulders at the bottom of said groove corresponding in number to the number and spacing of the fingers and between which said fingers are engageable for shouldered engagement therewith to prevent rotation of the cover member relative to the rim flange.

6. In a wheel structure including a wheel tire rim having radial and terminal rim flanges defining an inwardly facing groove, a circular wheel cover member having a turned outer peripheral edge for disposition inside of and in close proximity to but spaced generally radially inwardly from the rim edge of said terminal flange and having a plurality of circumferentially spaced resiliently deflectable retaining fingers on the underside of the cover with releasable finger portions spaced generally radially inwardly of the terminal rim flange in close proximity to the turned edge of said member, said fingers being arranged generally in a common circle for tensioned engagement with said rim with each of the finger portions accessible from the exterior of the cover member and directly engageable by the tip of a pry-off tool with the exterior of said turned edge of the cover member acting as a fulcrum for the tool to release said finger from engagement with the rim.

7. The wheel structure of claim 6 further characterized by the finger portions on the cover being notched and thereby providing an edge shoulder which upon prying of the finger away from the rim is cocked and engaged under tension against the outer tip of the terminal rim flange to preclude the finger from popping back into retaining engagement with the rim and until the cover is disengaged from the wheel.

8. In a wheel structure including a wheel tire rim having radial and terminal rim flanges defining an inwardly facing groove, a circular wheel cover member having a turned outer peripheral edge for disposition inside of and in close proximity to but spaced generally radially inwardly from the rim edge of said terminal flange and having a plurality of circumferentially spaced resiliently deflectable retaining fingers on the underside of the cover with finger terminals spaced generally radially outwardly of the turned outer edge of said member, said fingers being arranged generally in a common circle for tensioned engagement with said rim with each of the finger terminals accessible from the exterior of the cover member and directly engageable by a pry-off tool bearing on the exterior of said turned outer edge of the cover member to release said finger from engagement with the rim, said fingers being nestingly engaged in said rim groove with said finger terminals extending away from the rim and each having a tip engageable by the tool turned toward said turned outer edge to assist in disengaging the finger.

9. The wheel structure of claim 8 further characterized by said turned tip on the finger being return bent for reinforcement.

10. The wheel structure of claim 8 further characterized by the finger terminal having a shoulder which upon prying of the finger away from the rim is tentatively cocked and engaged under tension against the outer tip of the terminal flange to preclude the finger from popping back into retaining engagement with the rim and until the cover is disengaged from the wheel.

References Cited in the file of this patent

UNITED STATES PATENTS

| | | |
|---|---|---|
| 2,404,389 | Lyon | July 23, 1946 |
| 2,654,637 | Lyon | Oct. 6, 1953 |
| 2,683,631 | Lyon | July 13, 1954 |